United States Patent
Manzi et al.

(10) Patent No.: US 9,827,583 B2
(45) Date of Patent: Nov. 28, 2017

(54) METHOD AND APPARATUS FOR PAINTING OBJECTS

(71) Applicants: CMO DI SODINI DINO & C. S.N.C., Massa (IT); SCUOLA SUPERIORE S.ANNA, Pisa (IT)

(72) Inventors: Alessandro Manzi, Fara S. Martino (IT); Stefano Roccella, Livorno (IT); Jacopo Bucchioni, Villafranca Lunigiana (IT); Fabio Leoni, Vicarello (IT); Gabriele Ferri, Piombino (IT); Tommaso Fiorelli, Pisa (IT)

(73) Assignees: CMO DI SODINI DINO & C. S.N.C., Massa (IT); SCUOLA SUPERIORE S.ANNA, Pisa (IT)

(*) Notice: Subject to any disclaimer, the term of this patent is extended or adjusted under 35 U.S.C. 154(b) by 474 days.

(21) Appl. No.: 14/402,953

(22) PCT Filed: May 21, 2013

(86) PCT No.: PCT/IB2013/054159
§ 371 (c)(1),
(2) Date: Nov. 21, 2014

(87) PCT Pub. No.: WO2013/175392
PCT Pub. Date: Nov. 28, 2013

(65) Prior Publication Data
US 2015/0147460 A1    May 28, 2015

(30) Foreign Application Priority Data
May 21, 2012 (IT) .............................. PI2012A0062

(51) Int. Cl.
B05B 12/12    (2006.01)
B05B 13/04    (2006.01)
(Continued)

(52) U.S. Cl.
CPC ........ *B05B 12/122* (2013.01); *B05B 13/0278* (2013.01); *B05B 13/0431* (2013.01);
(Continued)

(58) Field of Classification Search
None
See application file for complete search history.

(56) References Cited

U.S. PATENT DOCUMENTS

| 4,357,900 A | 11/1982 | Buschor |
| 5,358,568 A | 10/1994 | Okano et al. |
| 2011/0262622 A1 | 10/2011 | Herre et al. |

FOREIGN PATENT DOCUMENTS

| EP | 2159538 A1 | 3/2010 |
| EP | 2196267 A2 | 6/2010 |

(Continued)

OTHER PUBLICATIONS

International Search Report dated Oct. 14, 2013, corresponding to International Patent Application PCT/IB2013/054159.

*Primary Examiner* — Nathan T Leong
(74) *Attorney, Agent, or Firm* — Ladas & Parry LLP

(57) ABSTRACT

An apparatus for painting an object, the apparatus having a painting head equipped with a spraying nozzle arranged to deliver a flow of paint on a surface. The apparatus also includes a device for moving the painting head in the space according to at least two degrees of freedom. An identification device is also provided for identifying the three-dimensional shape of the surface. A processing means is also provided to process the detected projected image and to determine the spatial coordinates of each point.

6 Claims, 18 Drawing Sheets

(51) Int. Cl.
   *G01B 11/25* (2006.01)
   *B05B 13/02* (2006.01)
   *B05D 1/02* (2006.01)
   *G06T 7/521* (2017.01)

(52) U.S. Cl.
   CPC ............ *B05B 13/0457* (2013.01); *B05D 1/02* (2013.01); *G01B 11/2513* (2013.01); *G06T 7/521* (2017.01); *G06T 2207/10048* (2013.01); *G06T 2207/30156* (2013.01); *G06T 2207/30208* (2013.01)

(56) References Cited

FOREIGN PATENT DOCUMENTS

| | | | |
|---|---|---|---|
| EP | 2208541 | A2 | 7/2010 |
| JP | 10264060 | A | 10/1998 |

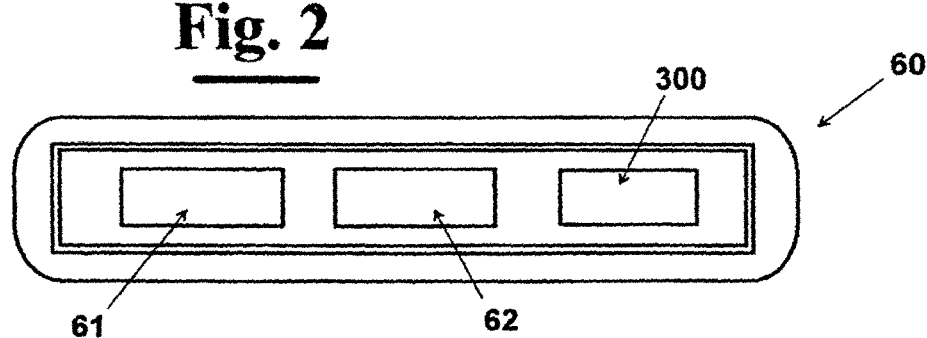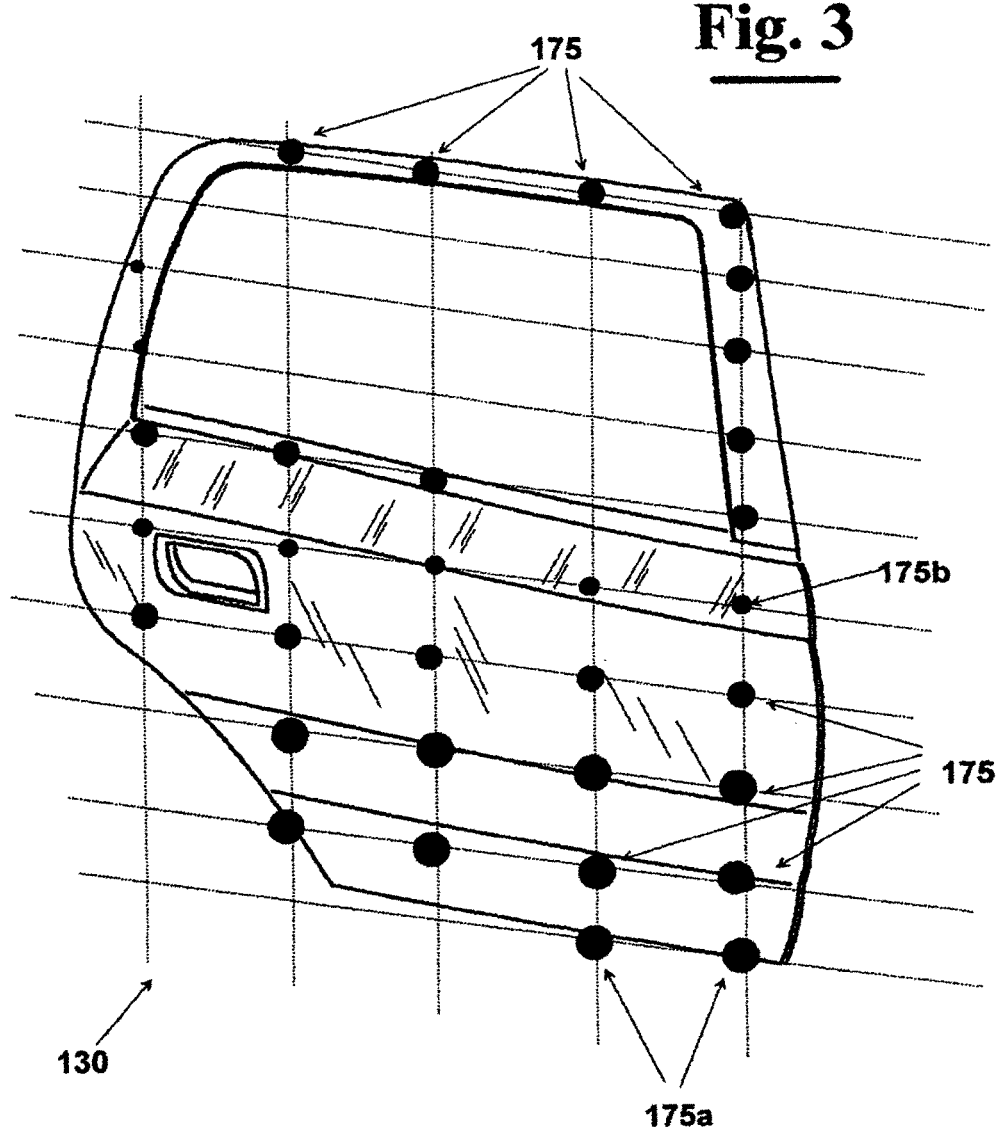

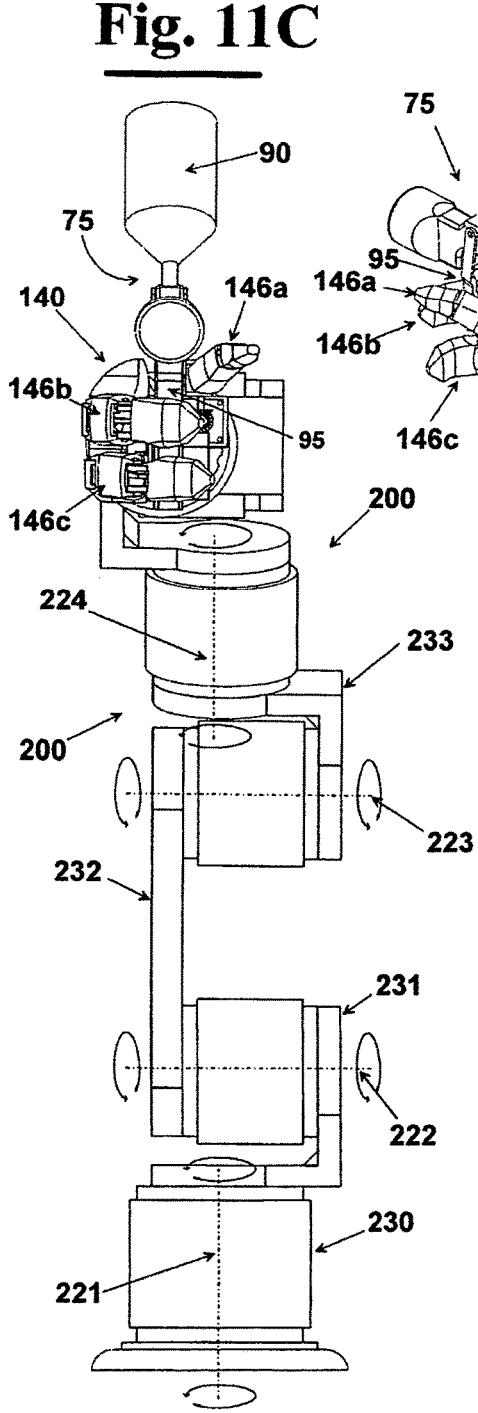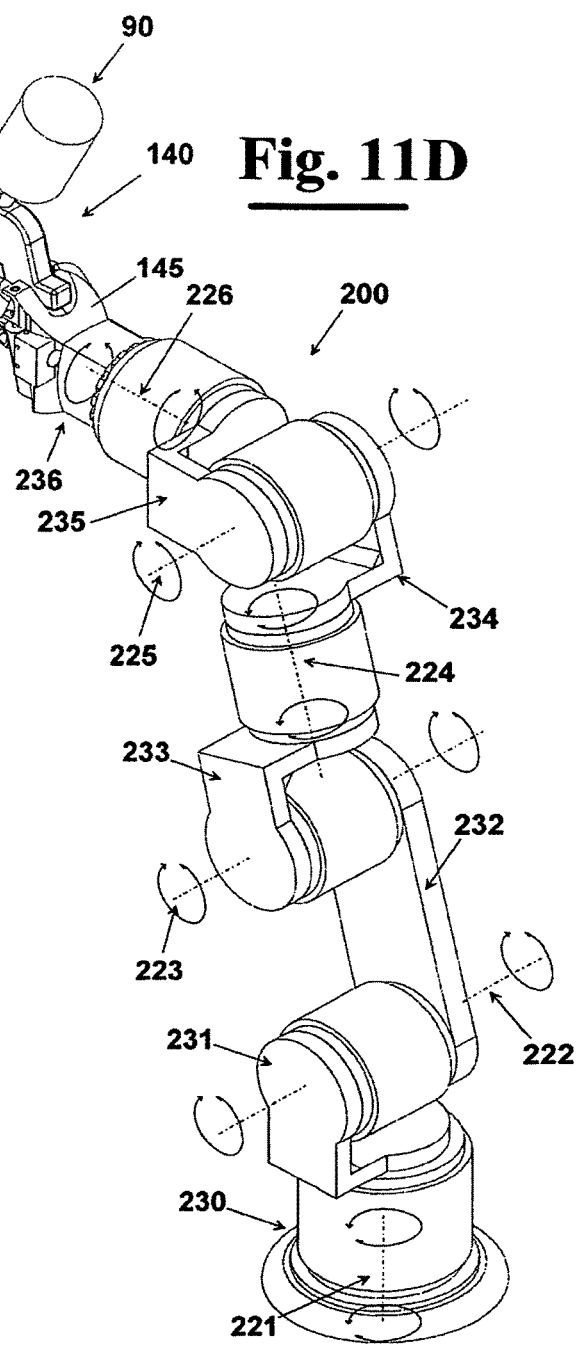

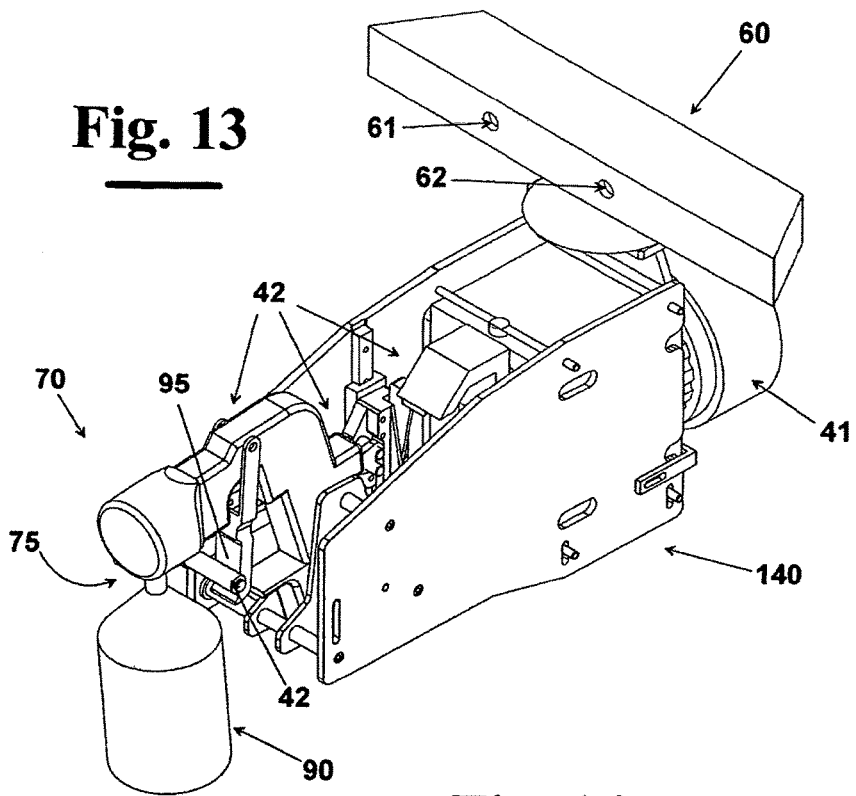
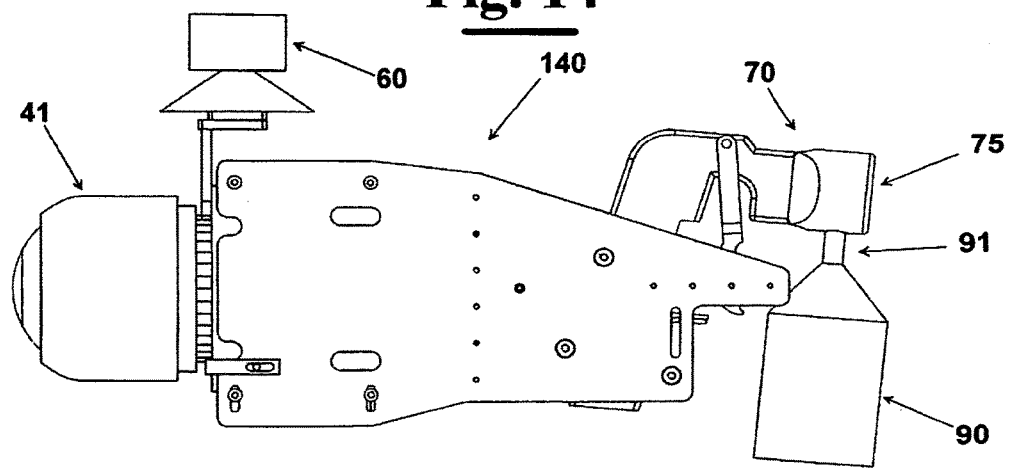

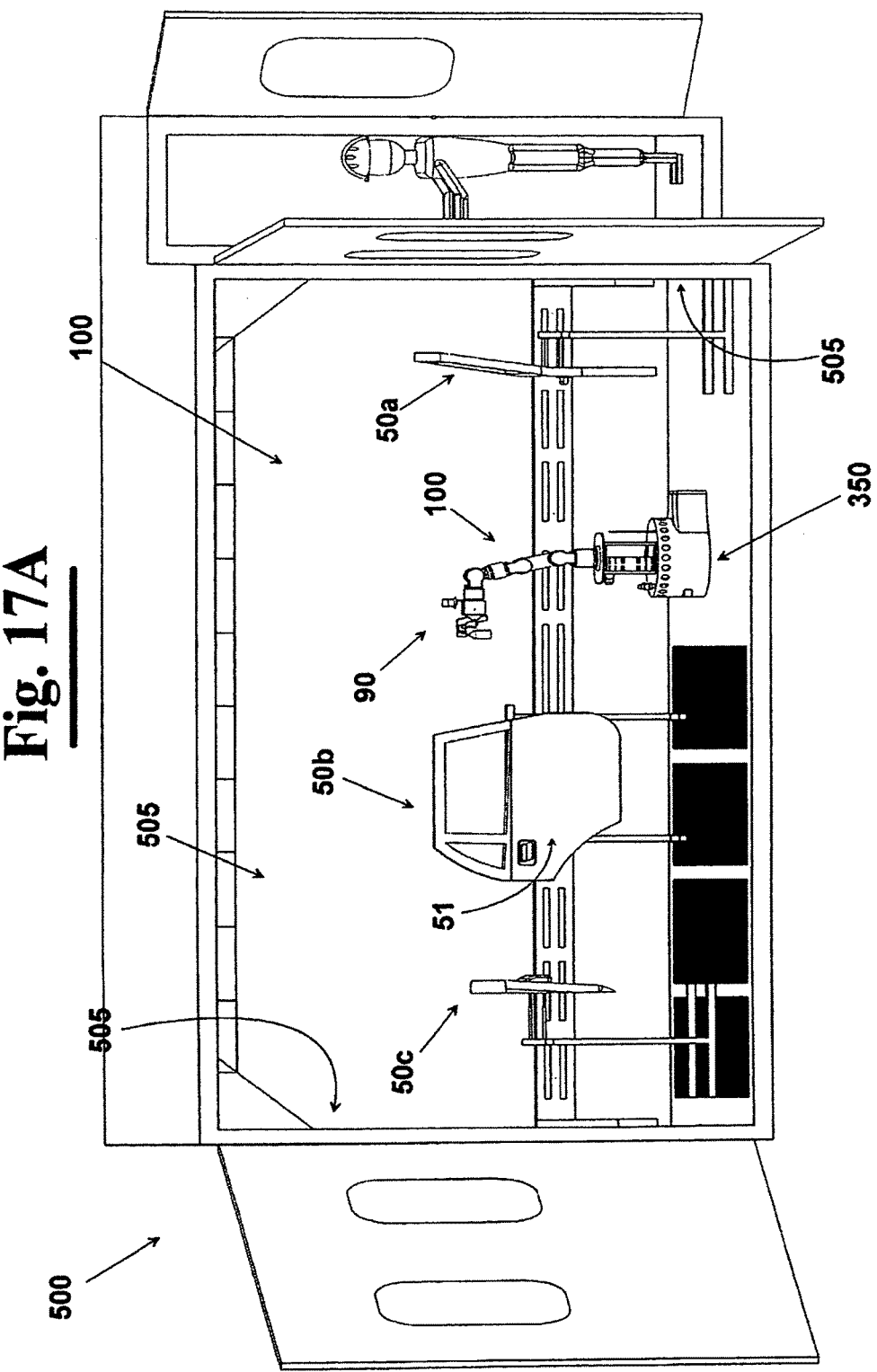

METHOD AND APPARATUS FOR PAINTING OBJECTS

This application is a 371 of PCT/IB2013/054159, filed on May 21, 2013, which claims priority to Italian Application No. PI2012A000062, filed May 21, 2012.

FIELD OF THE INVENTION

The present invention relates to the field of plants of painting objects, in particular parts of bodies of vehicles, such as bonnets, bumper, doors, but also hull of watercrafts, or fuselages of airplanes, etc. and, in particular the invention relates to a method for painting such objects and to an apparatus that carries out the method.

DESCRIPTION OF THE PRIOR ART

As well known, during a painting operation, in particular a spray painting, of objects such as parts of body of vehicles, the operator works in a particularly hostile environment, because he can be invested by a return of sprayed material, that is generally toxic for the human body.

Usually the operation is carried out in booths that usually are ventilated, but the operators are obliged in any case to wear protective clothes and accessories clothing such as masks and gloves, in order to protect their skin and their respiratory airways. Furthermore, during the painting the operator has to handle a spraying nozzle together with the ducts connected to it and thus bear for all the operation both the weight of the spraying gun and the pressure produced by the delivery of the material.

Therefore, in order to overcome the above described drawbacks different apparatuses have been designed for automating the painting of objects, in particular parts of body of vehicles such as cars, watercrafts, airplanes etc.

A first example of a known apparatus for painting objects is disclosed in U.S. Pat. No. 4,357,900. This solution provides to move the objects to be painted along a predetermined path where a painting station is arranged. The apparatus provides a sensor, in particular a photocell, which carries out an optical, electric, or magnetic, scanning for determining the position of the object. The signals that are detected by the sensor are then sent to a control device. Furthermore, a second sensor is provided arranged to send at the same control device a second signal when the object passes through a predetermined point. This way, the control device starts the painting of the object opening the spraying nozzle when the sensors detect that the object same has been positioned at the painting station.

However, the above described sensors have exclusively the function of signalling to the control device the position of the object, in order to operate the opening, or the closing, of the devices that perform the painting.

Another example of a known apparatus for painting objects is disclosed in U.S. Pat. No. 5,358,568. In this case, the apparatus provides a manipulator mounted on a carriage and comprising a plurality of articulated joints having translational and rotational movements. At the end of the last articulated joints of rotational type a spraying nozzle is mounted. At the spraying nozzle, or at the manipulator, a sensor is provided for detecting the distance of the spraying nozzle from the surface to be painted. A control means is also provided that, on the basis of the signal received from the sensor, maintains the spraying nozzle at a distance more or less fixed from the surface to be painted.

The sensor for measuring the distance is selected from the group consisting of: an ultrasonic sensor and an infrared sensor that emits ultrasonic pulses, or an infrared beam, respectively, in a direction approximately parallel to the delivery direction of the paint.

However, the above described technical solution does not allow to paint the surface at high speed. In fact, after each delivery of paint it is necessary to move the sensor in order to direct the ultrasonic pulses, or the infrared beam at the following point to be painted. This series of operations (detection of the distance of the sensor from the point to be painted, arrangement of the spraying nozzle at a predetermined distance from the surface to be painted and delivery of the paint) has to be repeated for all the points of the surface to be painted that usually has a complex geometry with different radiuses of curvature. Therefore, this solution, in addition to a long time for finishing the painting operation of all the surface, is also subjected at a high level of errors for carrying out many measurements of the distance carried out moving continuously the sensor.

Other more industrial systems paint in a quick and precise way parts of vehicles, but move on pre-programmed paths designed on the basis of the component to be painted and require a long time to reprogram the same if the component is replaced with another one having different shape and size.

Other examples of methods and apparatuses for painting an object with similar drawbacks are described in US2011/262622, JP10264060, EP2208541 and EP2196267.

SUMMARY OF THE INVENTION

It is then a purpose of the present invention to provide an apparatus for painting objects, in particular parts of body of vehicles, such as bonnets, mudguard, doors, frames, etc. that is able to overcome the above described drawbacks of the prior art apparatuses.

It is another purpose of the present invention to provide such an apparatus that is able to speed up and make adaptable, with respect to similar prior art apparatuses, the automatic procedure of painting the object and to reduce, at the same time, the possibility of make errors during the detection step of the distance of the surface to be painted from the spraying nozzle.

It is a further purpose of the present invention to provide such an apparatus that allows to identify in a single passage the three-dimensional shape of the surface to be painted and then the distance of the main points of the surface same from the painting head.

It is still a further purpose of the present invention to provide such an apparatus that allows to paint the object with high precision also in a hostile environment as that one produced by the spraying of paint.

It is still a further purpose of the present invention to provide a method for painting objects, in particular parts of body of vehicles that has the same advantages.

These and other purposes are achieved by an apparatus for painting an object, in particular a body part, said apparatus comprising:

- a painting head equipped with at least one spraying nozzle arranged to deliver a flow of paint of a predetermined colour on a surface of the object;
- a moving means for moving said painting head in a workspace, said moving means having at least two degrees of freedom;

whose main feature is to provide, furthermore:

- an identification device for identifying the three-dimensional shape of the above described surface of the object, said identification device being integral to the painting head and comprising:

an infrared projection means arranged to project a grid, or matrix, of points on the surface of the object obtaining a projected image on said surface comprising a plurality of points;

an optical sensor means arranged to detect the projected image of points obtaining a detected projected image, said detected projected image comprising a plurality of points, or pixels, having determined spatial coordinates (x,y,z);

a processing means arranged to receive said detected projected image from said sensor means and to determine said spatial coordinates (x,y,z) of each of said points of said projected image in such a way to determine the three-dimensional shape of said surface;

that the moving means is arranged to move the painting head inside the workspace on the basis of the determined spatial coordinates of the points in such a way that during the painting step the spraying nozzle is arranged at a substantially fixed distance from the surface to be painted and is able to follow its curvature;

and that the processing means is arranged to process the three-dimensional shape to obtain a corresponding two-dimensional geometric shape, the processing means arranged to process said grey-level values of said points, or pixels, of the three-dimensional shape, and therefore the distance of the points, or pixels, from the sensor means to obtain the corresponding two-dimensional geometric shape.

In particular, the spatial coordinates x, y of each of said points of said projected image can be determined on the basis of the position of each point, or pixel, in the detected projected image.

Advantageously, the spatial coordinates z of each of said points of said projected image are measured on the basis of the grey-level value of the corresponding point, or pixel in the detected projected image.

Preferably, the moving means comprises an anthropomorphic robot having at least six degrees of freedom. This solution allows to obtain a great freedom of movements and to simulate, in particular, a painting operation made by hand by an operator.

In particular, the processing means can be adapted to process the three-dimensional shape for determining a contour, or perimeter, of the above described two-dimensional geometric shape.

In particular, the processing means is configured to determine the higher grey-level value $l_{max}$ among all the points, or pixels, of said plurality of points of said detected projected image, corresponding to the point, or pixel, that is more distant from said sensor means, and the lower grey-level value $l_{min}$ among all the points, or pixels, of said plurality of points of said detected projected image, that corresponds to the point, or pixel, that is nearer to said sensor means. The processing means is then arranged to associate a first grey-level value, for example the value "255" corresponding to the white, to all the points having a grey-level value set between $l_{max}$ and $l_{min}$ and a second grey-level value, for example the value "0" corresponding to the black, to all the points having a different grey-level value. This way, the contour, or perimeter, of the two-dimensional geometric shape is determined defined by all the points, or pixels, which, after the above described processing step, have a grey-level value that is equal to the first value of the grey-level, i.e. the value 255.

Furthermore, the processing means is configured to associate the above described two-dimensional geometric shape to a model of a plurality of models contained in a predetermined database. For example, if the object is a body part of a car, or other vehicle, such as a door, a bonnet, a mudguard, etc., the processing means, on the basis of the contour, or perimeter, of the obtained two-dimensional geometric shape, starts a search of the model having a contour, or perimeter, that is geometrically more similar to it, among all the models that are present in the determined database. Such type of operation is made by the processing means through a comparison of the contour, or perimeter, of the obtained two-dimensional geometric shape, with the contour, or perimeter, of each model that is present in the database, associating to each comparison a similarity index $i_s$ and producing the result, i.e. the identification of the model that is geometrically more similar to the object to be painted, when the index is higher than a predetermined threshold value $i_s^*$. In addition, or alternatively to said criteria, the processing means is arranged to carry out said comparison with all the models that are present in the database obtaining a corresponding plurality of similarity indexes $i_{si}$ and producing as a result of the above described analysis the model to which has been associated the highest similarity index $i_{si}$.

If it is not possible to associate the detected part to a model present in the database, the processing means is arranged to memorize in the database the two-dimensional geometric shape of the object to be painted, and then to provide a self-learning procedure.

The moving means can be mounted on a guide, for example a rail, or a slide, along which the moving means can be moved for being arranged at a predetermined distance, in particular in proximity of the object to be painted.

In an advantageous exemplary embodiment of the invention, the moving means is mounted on a mobile platform, for example having a predetermined number of wheels, in particular three or four wheels. This way, it is possible to freely displace the moving means in a predetermined working area, for example in a painting cabin, in particular it is possible to position the moving means at any point of the surface x, y.

In particular, the mobile platform can be equipped with at least one sensor selected from the group consisting of:

a proximity sensor;

a distance sensor.

More in detail, on the basis of the signals that are detected by the proximity sensor and/or by the distance sensor, the mobile platform is arranged to move in the working area, for example a painting cabin, avoiding possible obstacles that have been detected.

In a preferred exemplary embodiment, an interface means is provided, for example at the painting head, arranged to engage, for example in a removable way, the painting head same to a predetermined tool, such as a spray can, or other container of paint, but also to a device for drying the paint, such as a supply of hot air, or other tools to finish the painted surface or the surface to be painted.

Advantageously, the interface means is provided with actuating means that is arranged to actuate, in particular to operate, or turn off, a predetermined tool. For example, in the case of a tool for delivering the paint, the actuating means is arranged to act on a push button, or on a lever, or a trigger, for operating in opening, or in closing, the valve that opens, or closes, the supply of paint.

In an exemplary embodiment, the actuating means comprises a main body and a plurality of secondary elongated bodies, or phalanxes, pivotally connected to said main body, each of said secondary elongated bodies comprising a predetermined number of stiff bodies, or "link", that are arranged in series and pivotally connected. In particular, the stiff bodies can be operated causing a rotation of the same about determined hinges for arranging the stiff bodies in predetermined working configurations corresponding to configurations of opening, or closing, of the anthropomorphic hand and configured in such a way to adapt mechanically itself to the different shapes of the manipulated tool for operating the same and then to turn on, or turn off, it for example in case of a paint supply device, to operate, or turn off, the push button, or trigger, which starts, or interrupts, the delivery of paint.

In particular, a painting cabin can be provided, inside of which the painting head and the object to be painted are arranged before starting a painting operation.

Advantageously, are, furthermore, provided:
an auxiliary projection means, said auxiliary projection means arranged to project a structured light laser on said object;
a detection means arranged to detect said structured light reflected by said object and to convert the same in an additional distance signal of said projection means from said object.

According to another aspect of the invention, a method for painting an object, in particular a car body part, comprises the steps of:
arranging a painting head in a predetermined workspace, said painting head equipped with at least one spraying nozzle arranged to deliver a flow of paint on a surface of an object to be painted;
moving said painting head in a workspace, said moving step being carried out by a moving means having at least two degrees of freedom;
and wherein the further steps are also provided:
identifying the three-dimensional shape of said surface of said object, said identifying step comprising the steps of:
projecting a grid, or matrix, of infrared points on said surface of said object, obtaining a projected image comprising a plurality of points having determined spatial coordinates;
detecting said projected image obtaining a detected projected image comprising a plurality of points, or pixels, having determined spatial coordinates (x,y,z), said detecting step carried out by optical sensor means integral to said painting head;
processing said detected projected image, said processing step arranged to determine said spatial coordinates (x,y,z) of each of said points of said detected projected image in order to determine e the three-dimensional shape of said object, in particular said spatial coordinates x, y being determined on the basis of the position of each point, or pixel, in the detected projected image, the processing step comprising a step of converting the three-dimensional shape in a two-dimensional geometric shape of the surface of the object, the converting step being carried out computing the grey-level values of the points, or pixels, of the detected projected image;
moving said painting head in said working area on the basis of said spatial coordinates of said points in such a way that during said painting step said spraying nozzle is arranged at a substantially fixed distance from said surface of said object.

Advantageously, the processing step furthermore comprises the steps of:

comparing said two-dimensional geometric shape with the two-dimensional geometric shapes of a plurality of models contained in a predetermined database, said comparing step being carried out on the basis of the grey-level values of a predetermined group of points of said detected projected image and of a corresponding group of points, i.e. consisting of points placed in the same spatial coordinates x, y of the points of the group of points of the detected projected image that has been examined, of said models;
associating to each model of said plurality of corresponding similarity index $i_s$ with said object;
selecting among said plurality of models the model having the highest similarity index, or the similarity index $i_s$ that is higher than a predetermined threshold value $i_s^*$;
associating said selected model to said two-dimensional geometric shape of said object to be painted;
displaying a variety of colours associated to said selected model;
selecting a predetermined colour among said variety of colours.

In particular, the comparing step comprises the steps of:
identifying the contour, or perimeter, of said two-dimensional geometric shape,
said identifying step providing the steps of:
computing the highest grey-level value $l_{max}$ among all the points, or pixels, of said plurality of points of said detected projected image, corresponding to the point, or pixel, that is most distant from said sensor means;
computing the lowest grey-level value $l_{min}$ among all the points, or pixels, of said plurality of points of said detected projected image, corresponding to the point, or pixel, nearest to said sensor means;
associating a first grey-level value, in particular the value "255" corresponding to the white, to all the points having a grey-level value set between $l_{max}$ and $l_{min}$ and a second grey-level value, in particular the value "0" corresponding to the black, to all the points having a different grey-level;
comparing said defined contour, or perimeter, with the contour, or perimeter, of said plurality of models contained in said database.

In particular, said comparing step is carried out comparing the contour, or perimeter, of the two-dimensional geometric shape of the object to be painted with the contour, or perimeter, of the models that are present in the above described database.

Advantageously, a centring step is provided for centring said sensor means with respect to said surface of said object to be detected, said centring step comprising the steps of:
detecting a position of said optical sensor means with respect to said surface of said object to be painted, said detecting step comprising the steps of:
determining by said processing means the spatial coordinates of a centroid of said detected projected image;
creating a geometric figure of reference arranged to approximate said detected projected image;
identifying by said processing means the centre of said geometric figure of reference;
moving said optical sensor means and therefore said painting head with respect to said object up to cause said centre of said geometric figure to coincide substantially with said centroid of said detected projected image and with said position of said optical sensor means.

In particular, the above described steps can be repeated until the position of the centroid and the centre of said geometric figure are arranged at a distance lower than a predetermined threshold value.

Advantageously, the spatial coordinates z is determined on the basis of the grey-level value of the corresponding point, or pixel.

BRIEF DESCRIPTION OF THE DRAWINGS

The invention will be now shown with the following description of an exemplary embodiment thereof, exemplifying but not limitative, with reference to the attached drawings in which:

FIG. 2 shows an elevational front view of an identification device of the shape of the surface to be painted provided by the apparatus of FIG. 1;

FIG. 3 diagrammatically shows an example of projected image computed by the processing means provided by the apparatus of FIG. 1 to determine the shape of the surface to be painted;

FIGS. 11A to 11D show the exemplary embodiment that provides an anthropomorphic robotic hand alternative to the actuation means of FIG. 8;

FIGS. 12 to 15 show another exemplary embodiment of the actuation means of FIG. 8 that provides a plurality of leverages;

FIGS. 17A and 17B diagrammatically show, respectively an elevational side view of and a partially cross sectional perspective view of a possible painting cabin in which a second exemplary embodiment of the apparatus of FIG. 1 can be installed;

DETAILED DESCRIPTION OF SOME EXEMPLARY EMBODIMENTS

Figure 1:
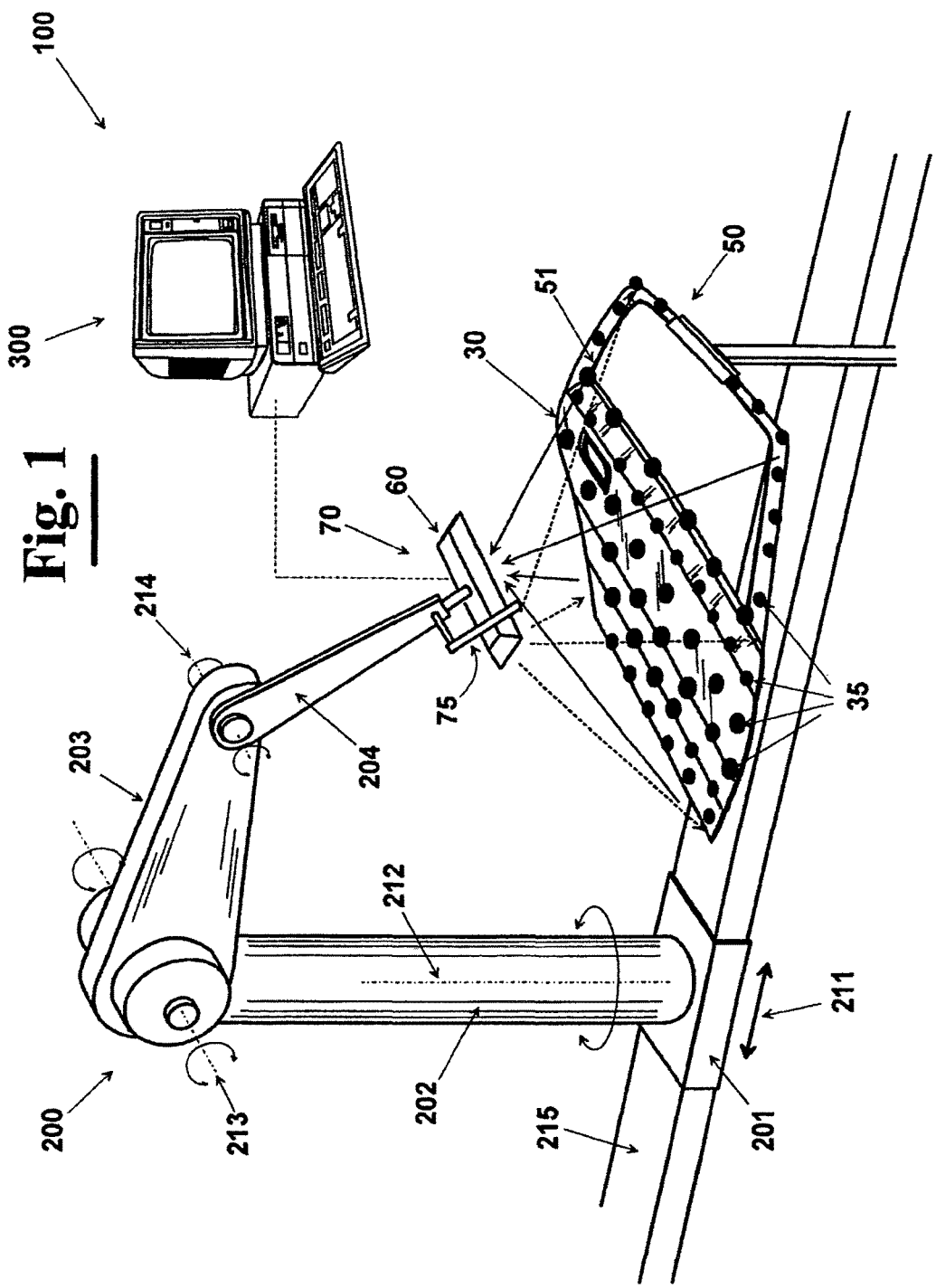
FIG. 1 diagrammatically shows a perspective elevational side view of a possible exemplary embodiment of an apparatus, according to the present invention, for painting an object.

As diagrammatically shown in FIG. 1, a possible exemplary embodiment of an apparatus 100 for painting an object 50, for example a body part of a car, such as a bonnet, a door, a bumper, but also a hull of a watercraft, or the fuselage of an airplane, etc. comprises a painting head 70 equipped with at least one spraying nozzle 75 arranged to deliver a flow of paint of a predetermined colour on a surface 51 of the object 50 to be painted.

The apparatus 100 also comprises a moving means 200 for moving the painting head 70 in a workspace, for example defined by the walls 505 of a painting cabin 500 (FIGS. 16A-17B). The moving means 200 has two, or more, degrees of freedom. For example, in an exemplary embodiment of FIG. 1, the moving means 200 provides a base 201 slidingly mounted on a rail 215 along a translation direction 211, a first stiff body 202 pivotally connected to the basis 201, in order to rotate about a first rotation axis 212, a second rigid body 203 pivotally connected to the first stiff body 202 about a second rotation axis 213 and a third rigid body 204 pivotally connected to the second rigid body 203, in order to rotate about a third rotation axis 214.

Figure 4:
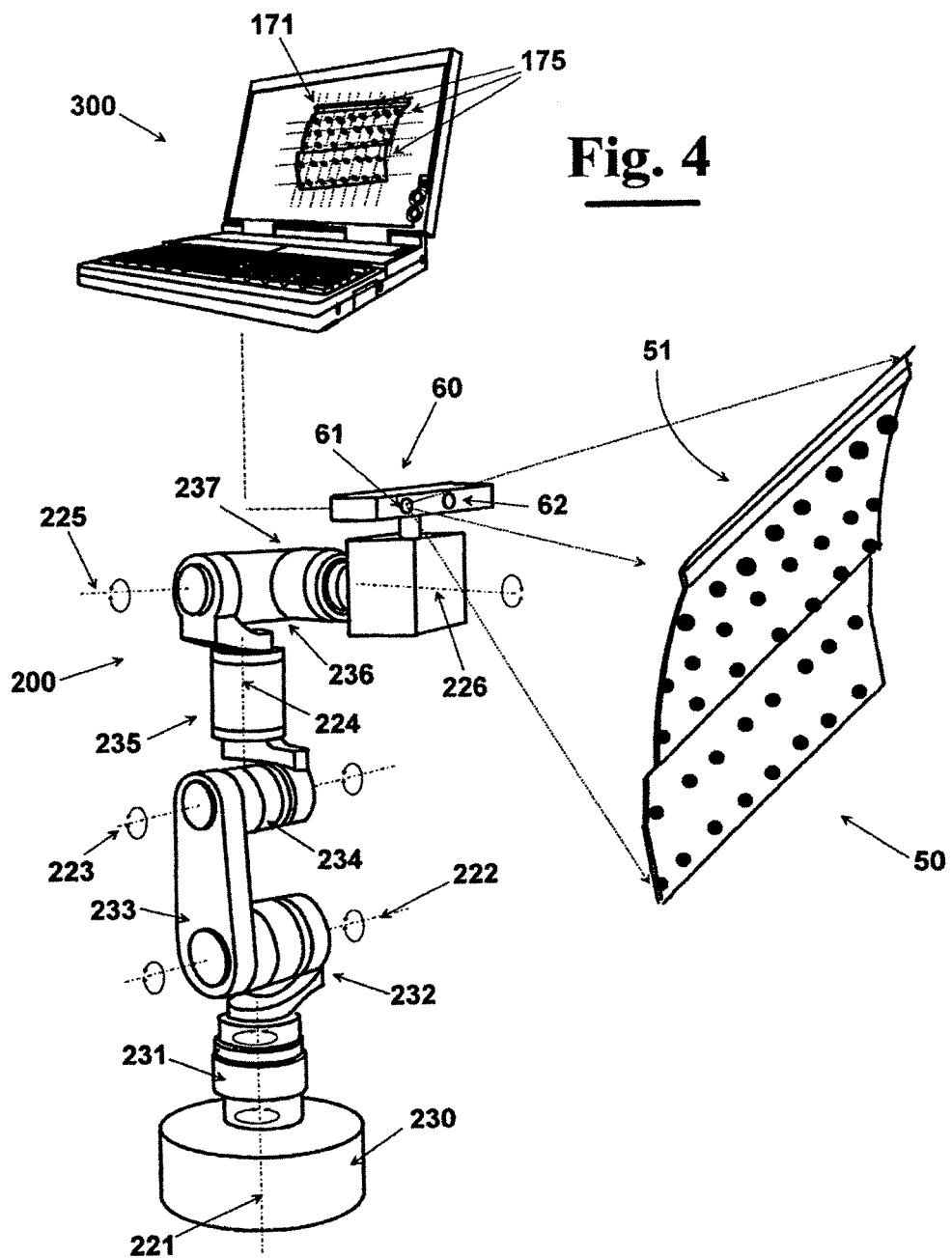
FIG. 4 diagrammatically shows a perspective elevational side view of a possible exemplary embodiment of the apparatus of FIG. 1.

According to what provided by the present invention, furthermore, the apparatus 100 is provided with a detection device 60 for identifying the three-dimensional shape of the above described surface 51 of the object 50 to be painted. More in detail, the identification device 60 is mounted integral to the painting head 70 and, as diagrammatically shown for example in FIG. 2, comprises a projection means 61 arranged to project a grid 30, or matrix, of infrared points 35 on the surface 51 to be painted obtaining a projected image also this comprising a plurality of points. The device 60 also comprises optical sensor means 62 configured to detect the projected image of points obtaining a detected projected image 130 comprising a plurality of points 175 having determined spatial coordinates (x,y,z) (FIG. 3). The apparatus 100 also comprises a processing means 300 arranged to receive the detected projected image 130 from the sensor means 62 and to determine the spatial coordinates (x, y, z) of each point, or pixel, 175 of the projected image 130 in order to determine the three-dimensional shape 171 of the surface 51. The processing means 300 is configured in particular to measure the grey-level value of each point 175 of the projected image (FIG. 4). More in detail, the x, y coordinates of each point correspond to the coordinates, i.e. to the position of the point, or pixel, in the image 130, whereas the coordinate z, can be measured by the processing means 300 on the basis of the grey-level value determined for each point, or pixel. The grey-level value corresponds, therefore, to the distance of the point, or pixel, 175 examined by the sensor means 62. More in detail, as diagrammatically shown in FIG. 3 each point 175, or pixel, of the image 130 has a predetermined grey-level value responsive to the distance of the point 175, or pixel, from the sensor means 62. For example, in the case of FIG. 3, the points 175a, owing to the curvature of the object 50, result to be arranged by the sensor means 62 at a distance d that is higher than the distance d' of the points 175b and therefore they would have a grey-level value that is higher than the latter. In FIG. 3, only for illustrative purposes, the different grey-level value is diagrammatically shown with a point having a different size.

The processing means 300 can be integrated in the identification device 60, or a processor can be provided that is external to the device 60 and arranged to receive the data by the sensor means 62 and to process them as above described.

The moving means 200 are adapted to move the painting head 70 in the workspace on the basis of the spatial coordinates (x,y,z) of the points 175 determined as above described, in such a way that, during the painting, the spraying nozzle 75 is arranged at a distance d substantially fixed from the surface 51 to be painted allowing, therefore to follow the curvature of the surface 51 of the object 50. This exemplary embodiment allows, in particular to detect the shape of the surface 51 in a single passage and then to provide the painting step by the spraying nozzle 75 on the basis of the data detected before starting the painting step, i.e. of the spatial coordinates (x, y, z) of the points 175. This way, with respect to similar apparatus of prior art it is possible to determine the spatial coordinates (x, y, z) of the points of interest with a single detecting step and then speeding up the whole painting operation. This way, it is, furthermore, possible to reduce, up to eliminate, the possibility of make errors during the detection of the data.

Figure 11A:
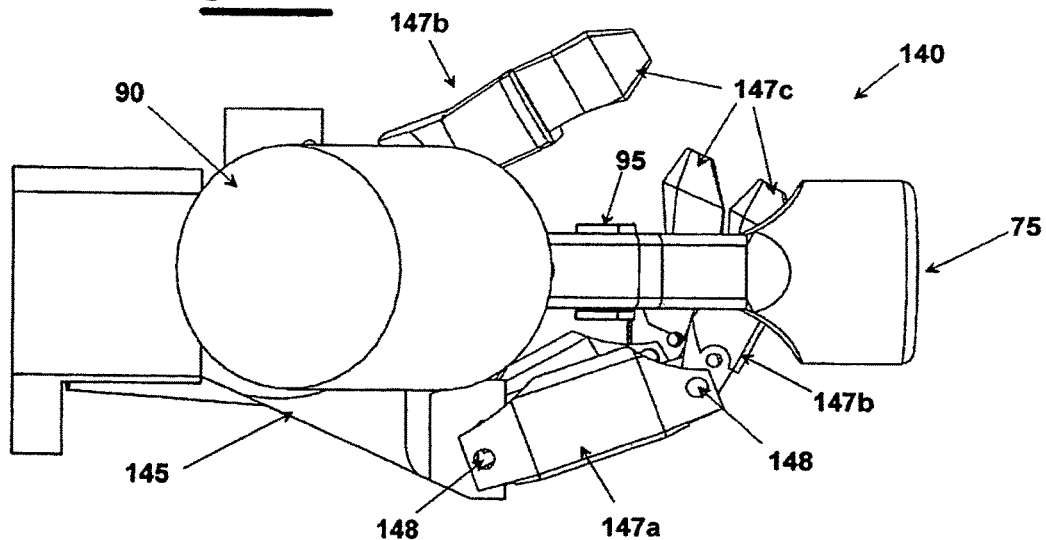
Figure 11B:
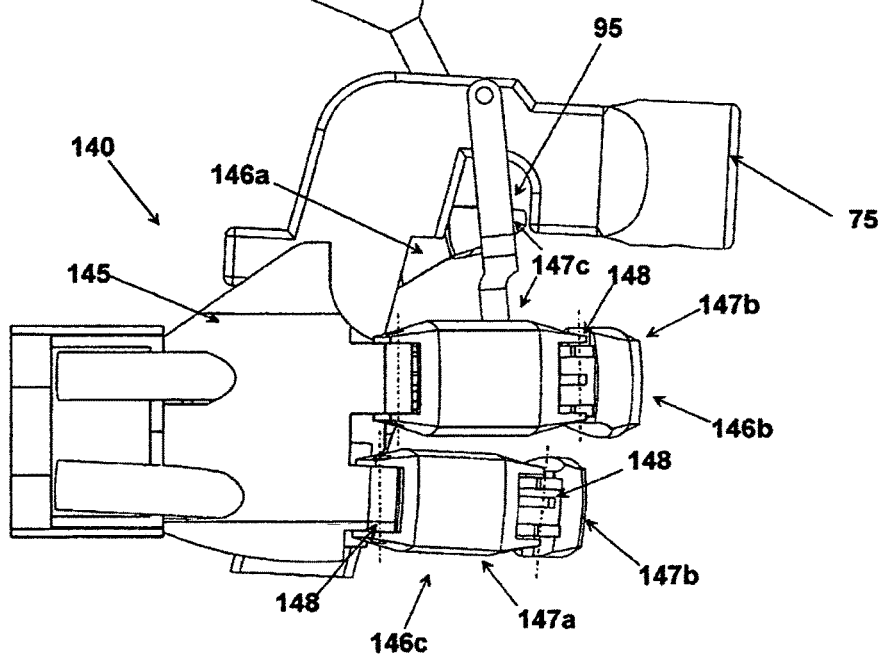
Figure 12:
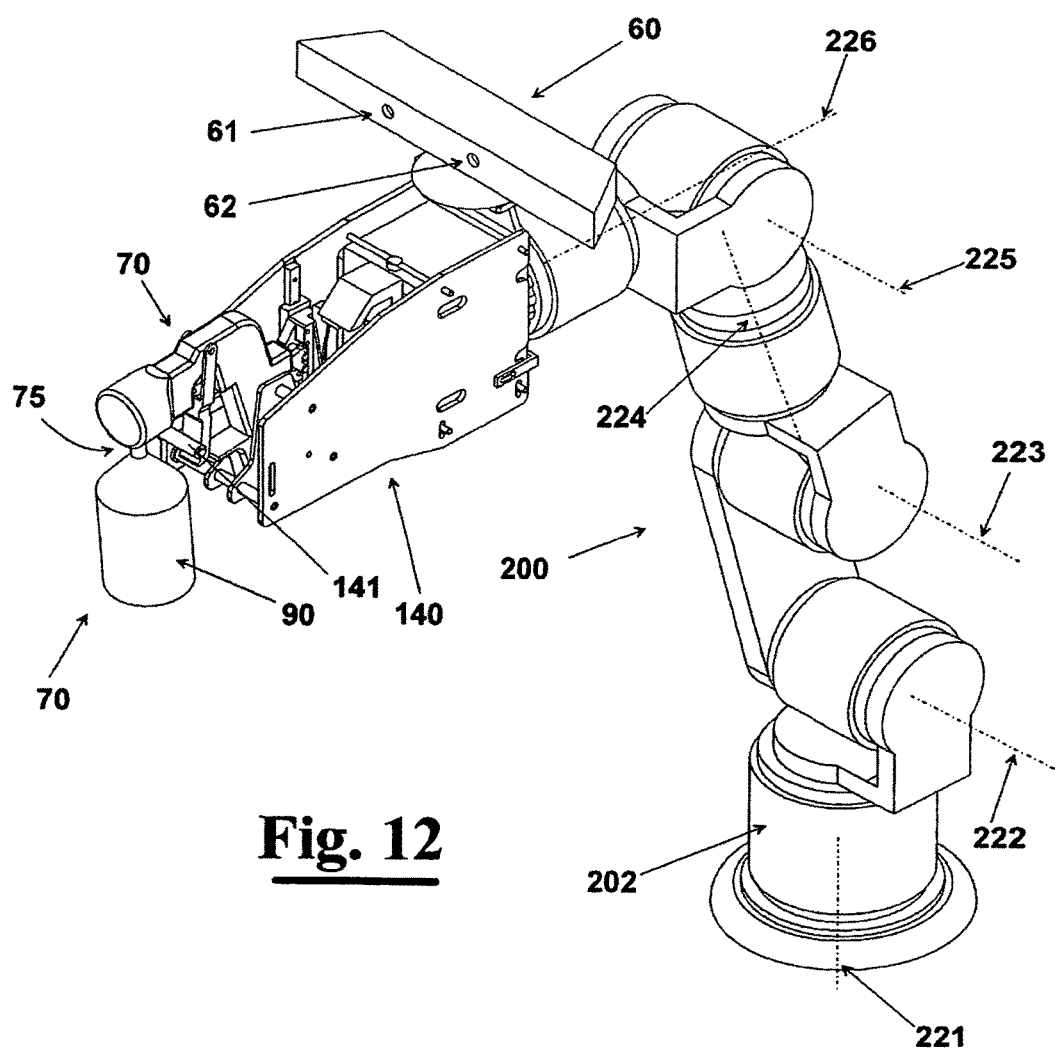
Figure 15:
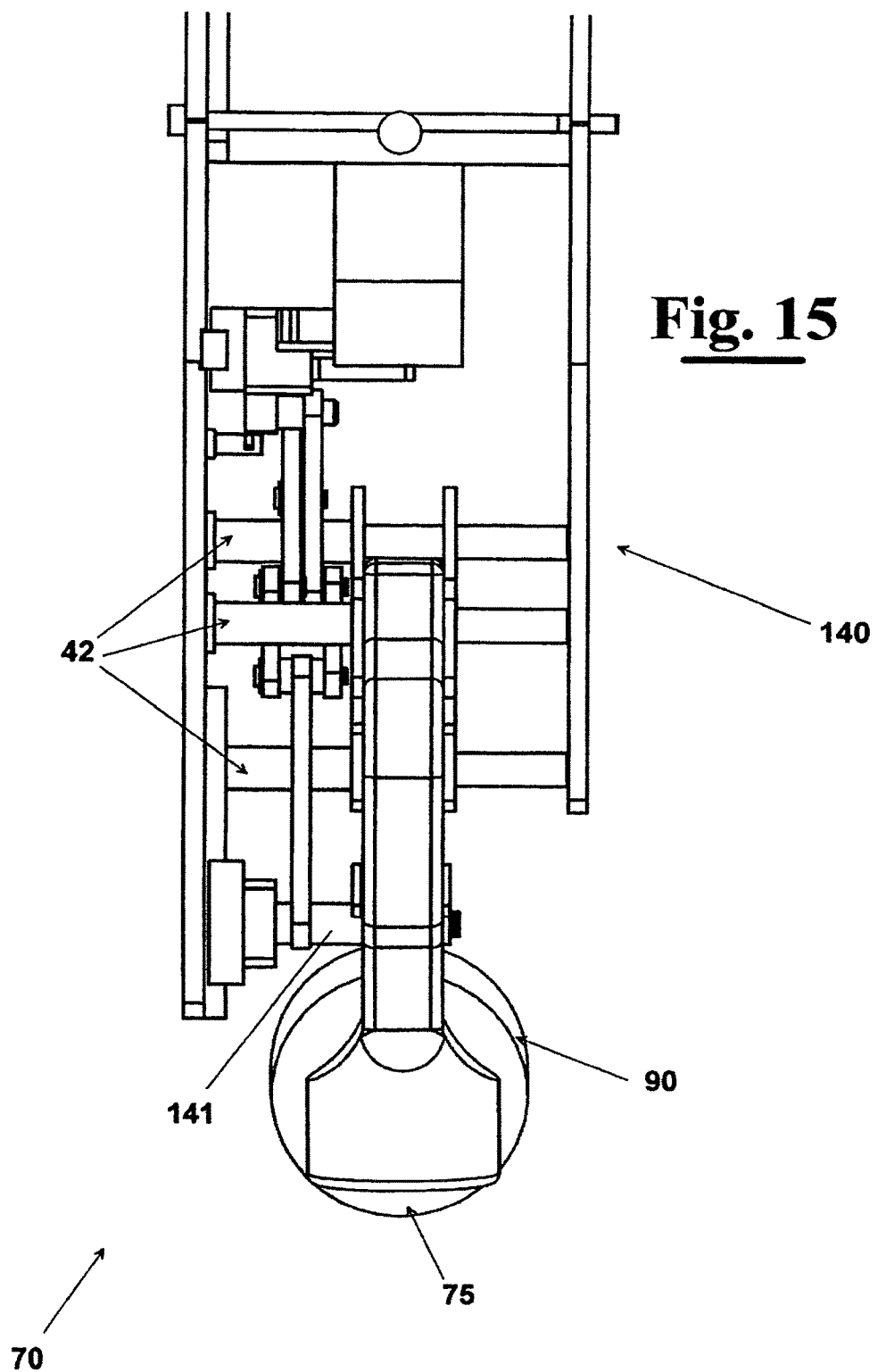

In the preferred exemplary embodiment of FIG. 4, the moving means 200 comprises an anthropomorphic robot 200 having at least six degrees of freedom, for example six rotational degrees of freedom defined by respective rotational axes 221-226. In particular, the moving means 200 comprises a plurality of stiff bodies 230-237 pivotally connected (FIGS. 4, 11C and 11D). Such structure makes it possible to obtain a great freedom of movements and to provide a final painting similar to that one made by hand by an operator.

Figure 5:
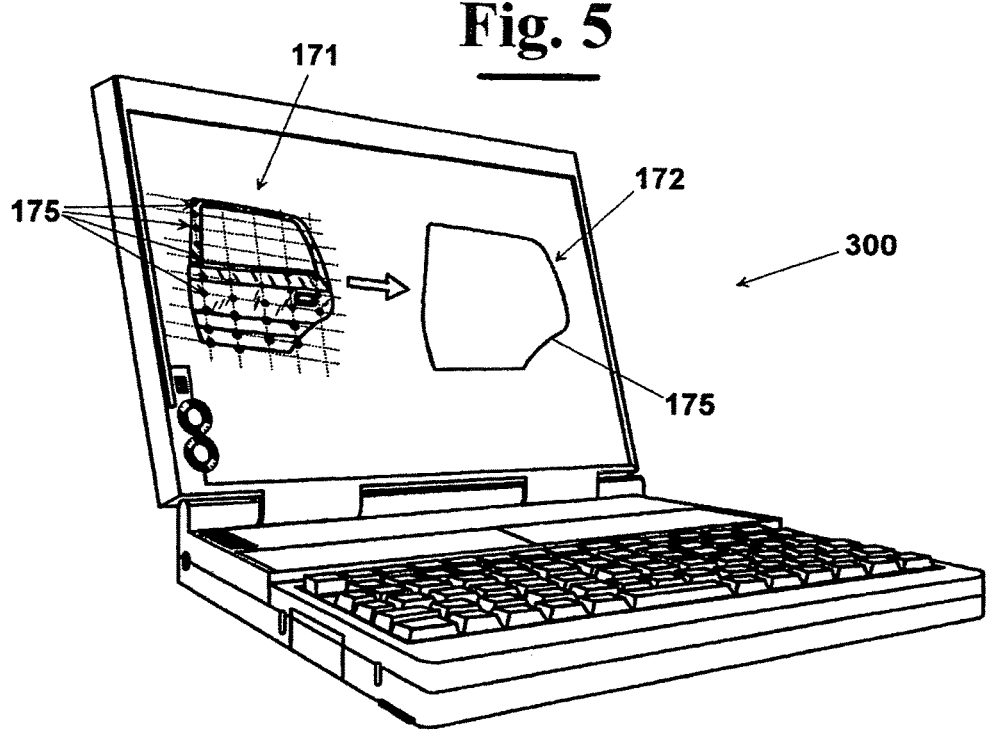
FIG. 5 diagrammatically shows a processing step carried out by the processing means provided by the apparatus of FIG. 1 to determine the two-dimensional shape of the surface.
Figure 6:
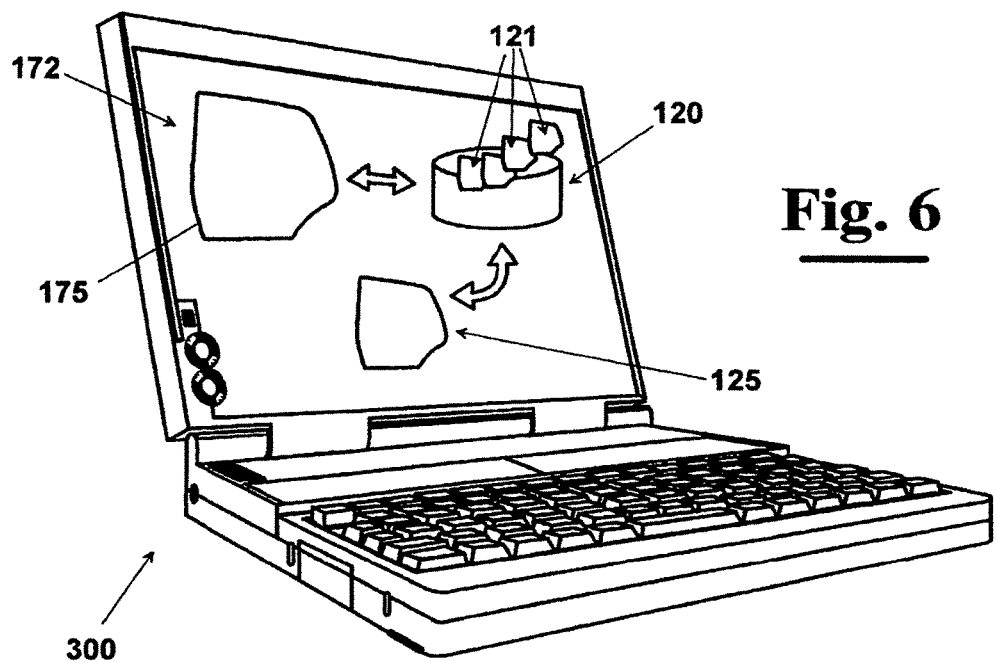
FIG. 6 diagrammatically shows a processing step carried out by the processing means provided by the apparatus of FIG. 1 for associating to the two-dimensional shape of the surface a predetermined model among all the models present in a database.

As diagrammatically shown in FIG. 5, the processing means 300 is adapted to process the data relative to the three-dimensional shape 171 in such a way to obtain a corresponding two-dimensional geometric shape 172. In particular, the processing means 300 is arranged to process the three-dimensional shape 171 in order to obtain a contour 175 of the above described two-dimensional geometric shape 172. According to an exemplary embodiment shown in FIG. 6, the processing means 300 can be, furthermore, arranged to associate the above described two-dimensional geometric shape 172, in particular the contour 175 of the same, to a model of a plurality of models contained in a database 120. For example, if the object 50 to be painted is a body part of a car, or other vehicle, such as a door, a bonnet, a mudguard, etc., the processing means 300, on the basis of the contour 175 of the obtained two-dimensional geometric shape 172, starts a search of the model 125 that is geometrically more similar to it, among all the models 121 that are present in the database 120. Such type of step is carried out by the processing means 300 carrying out a comparison of the contour 175, or perimeter, of the obtained two-dimensional geometric shape 172, with the contour of each model 121 present in the database 120 and associating to each comparison a similarity index $i_s$. The processing means 300 produces, thus as a result the model 125 associated to an index $i_s$ higher than a predetermined threshold value $i_s^*$. Alternatively, the identified model 125 can correspond to the model that has the index $i_s$ that is the highest one among all the models 121 compared with the detected two-dimensional geometric shape 172.

If the two-dimensional geometric shape 172 is not associated with none of the models 121 present in the database 120, in particular if none of the similarity indexes $i_s$ determined is higher than said predetermined threshold value $i_s^*$, the processing means 300 is configured to store the corresponding two-dimensional geometric shape 172, introducing it in the database 120, therefore doing a self-learning procedure.

Figure 7:
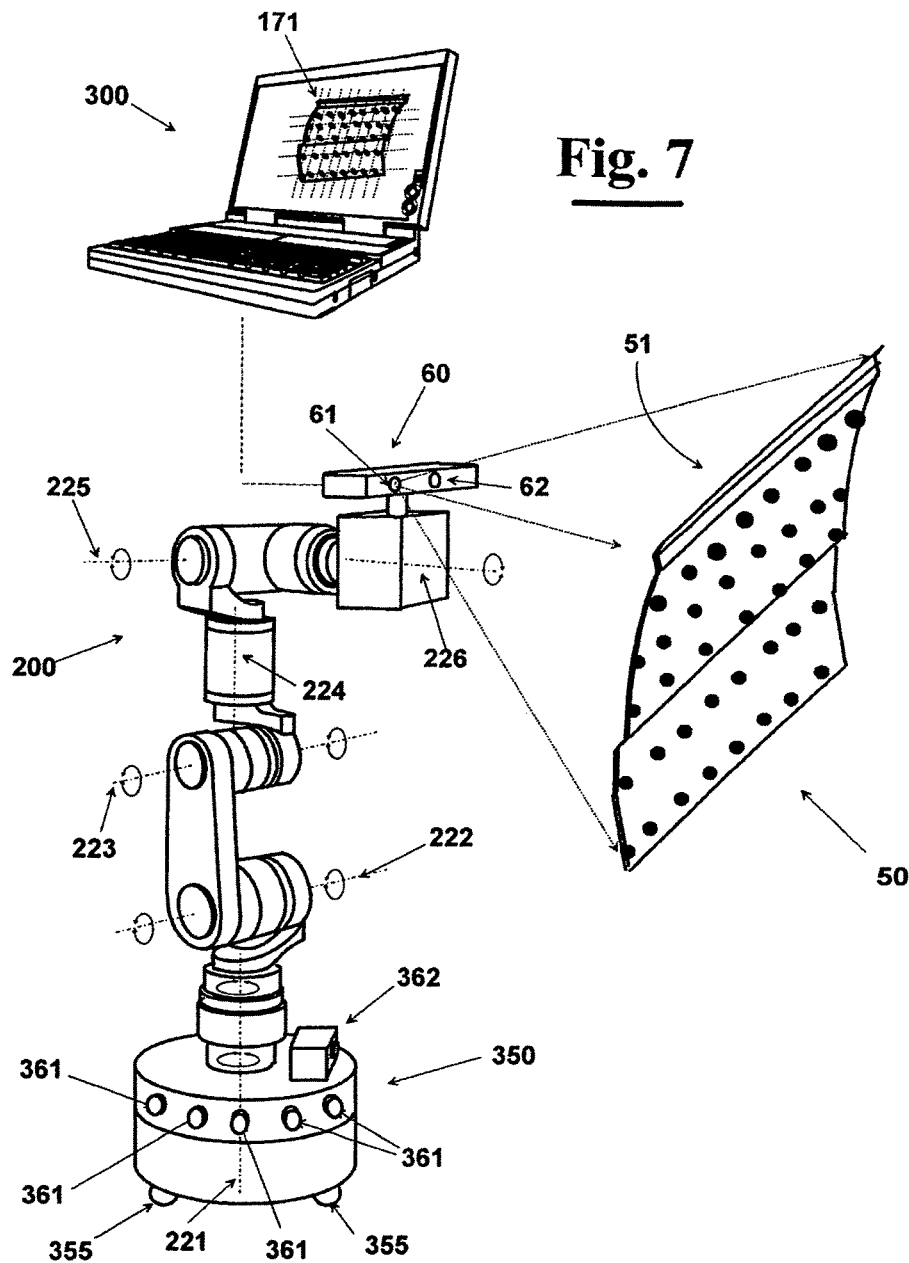
FIG. 7 diagrammatically shows a perspective elevational side view of another possible exemplary embodiment of the apparatus of FIG. 1.
Figure 8:
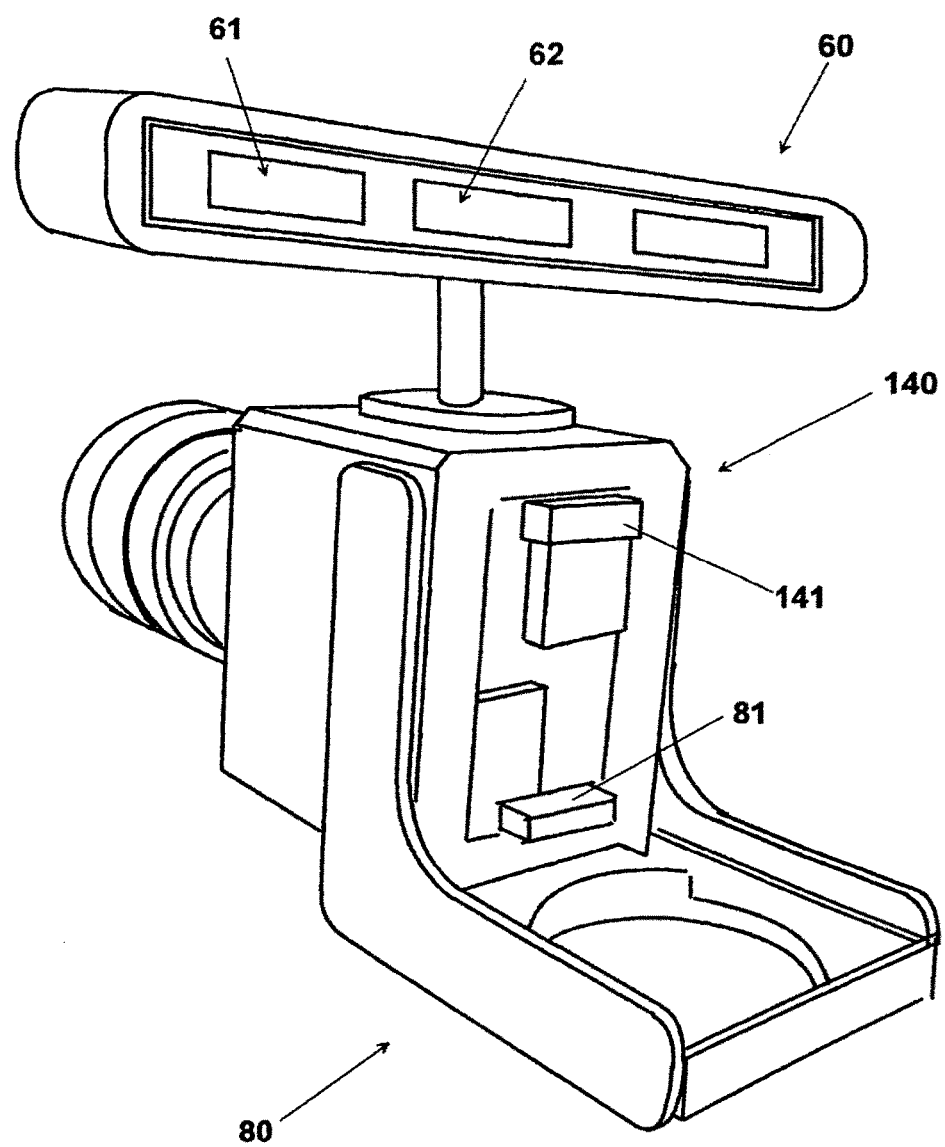
FIGS. 8 to 10 diagrammatically show a first exemplary embodiment of an interface and operating means provided at the painting head of the apparatus of FIG. 1.

In the exemplary embodiment of FIG. 7, the moving means 200 is mounted on a mobile platform 350, for example having a predetermined number of wheels 355, in particular three, or four wheels. This way, it is possible to move the moving means 200 in a predetermined working area, for example the inside of a painting cabin 500, with an absolute freedom of movement. In the exemplary embodiment of FIGS. 16A and 16B, the platform 350 is slidingly mounted on a guide, for example a rail, or a monorail, 370 defining a working path along which the objects 50a-50c to be painted are arranged. In the exemplary embodiment diagrammatically shown in FIGS. 17A and 17B, instead, the platform 350 is mounted on a predetermined number of wheels, for example three wheels, and is, therefore provided, as above described, of a higher freedom of movement with respect to the case of FIGS. 16A and 16B.

Figure 17B:
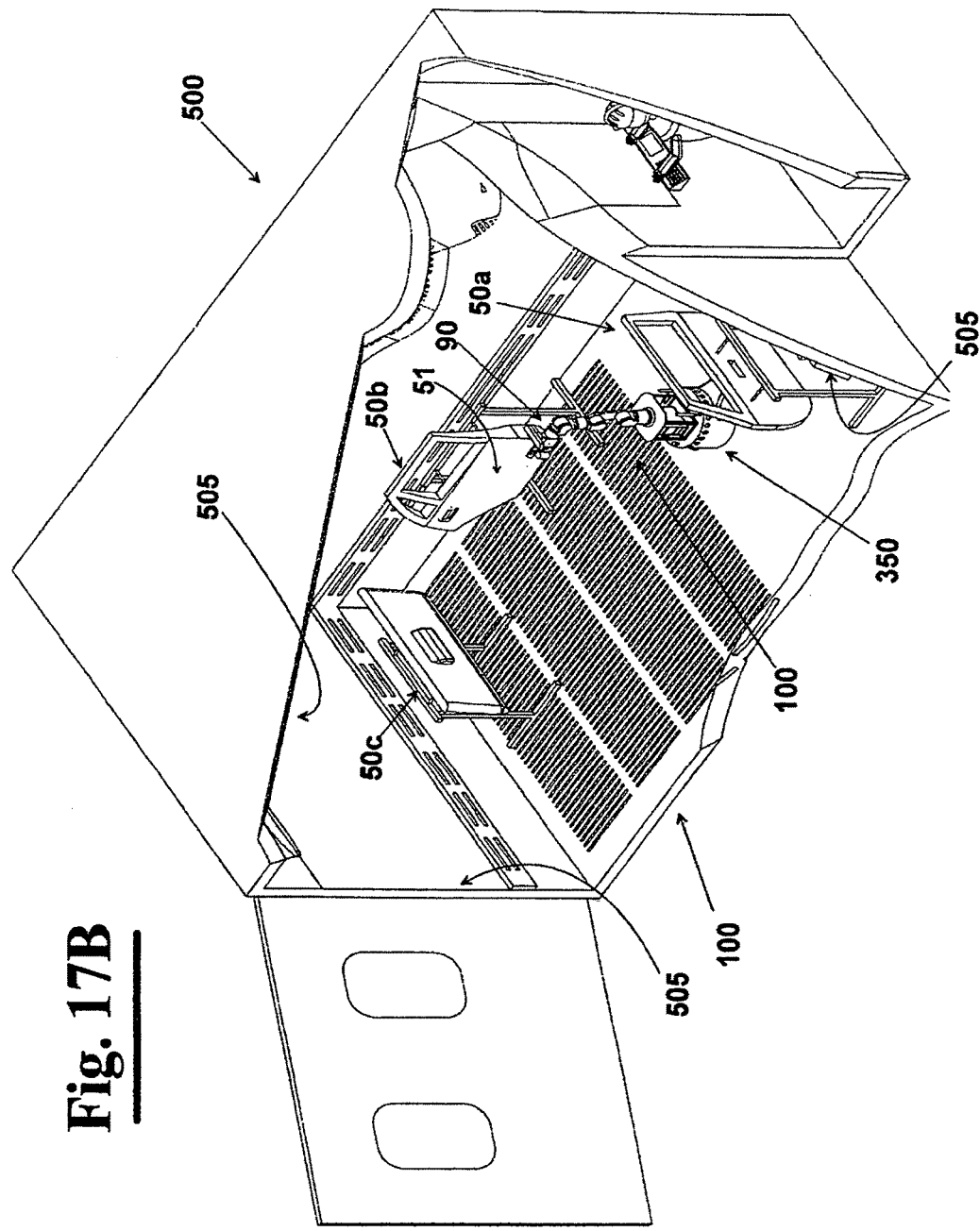

In particular in the case shown in FIGS. 17A and 17B, the mobile platform 350 can be equipped with at least one sensor for detecting possible obstacles present in the working area. For example, as diagrammatically shown in an exemplary embodiment of FIG. 7, the sensors for detecting the obstacles can comprise one, or more distance sensors 361 and at least one proximity sensor 362. On the basis of the detected signals by a, or each, proximity sensor 361 and/or by a, or each, distance sensor 362, the mobile platform 350 is adapted to move in the working area, in order to avoid the detected obstacles.

In the exemplary embodiment diagrammatically shown in FIGS. 8 to 15, an interface means 80 is provided, which is arranged, for example, at the painting head 70, and is arranged to engage, for example in a removable way, the painting head 70 same to a predetermined tool 90, such as a spray can, or other container of paint, but also a device for drying the paint, such as a supply device of hot air, or other tools to provide the finishing of the painted surface, or the surface to be painted. The interface means 80 can comprise a support plane 81 on which the tool 90 is arranged and possible fixing elements, for example a belt 82 for fastening the tool 90.

Figure 9:
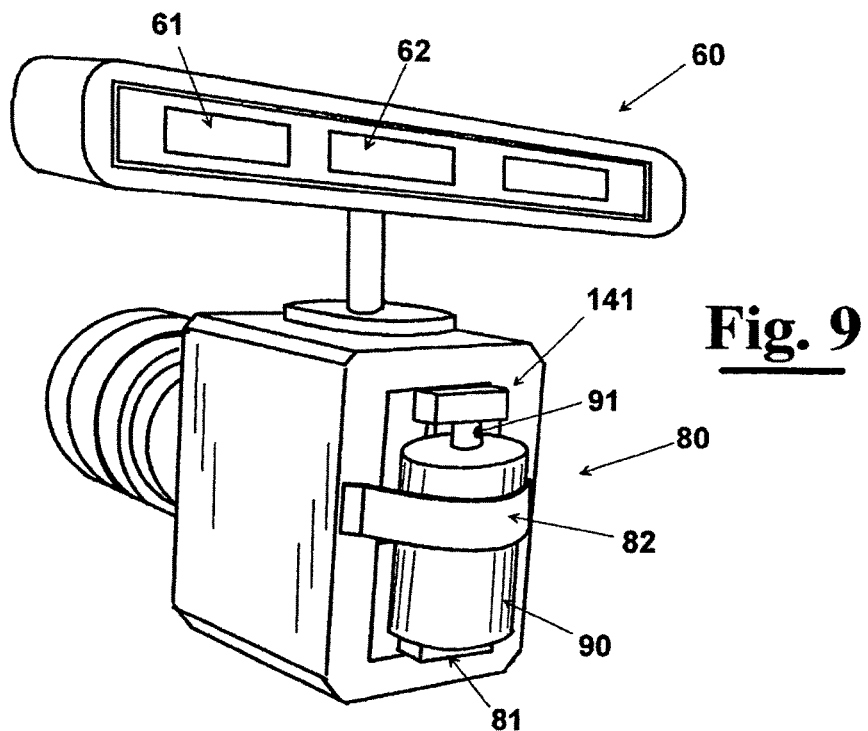
Figure 10:
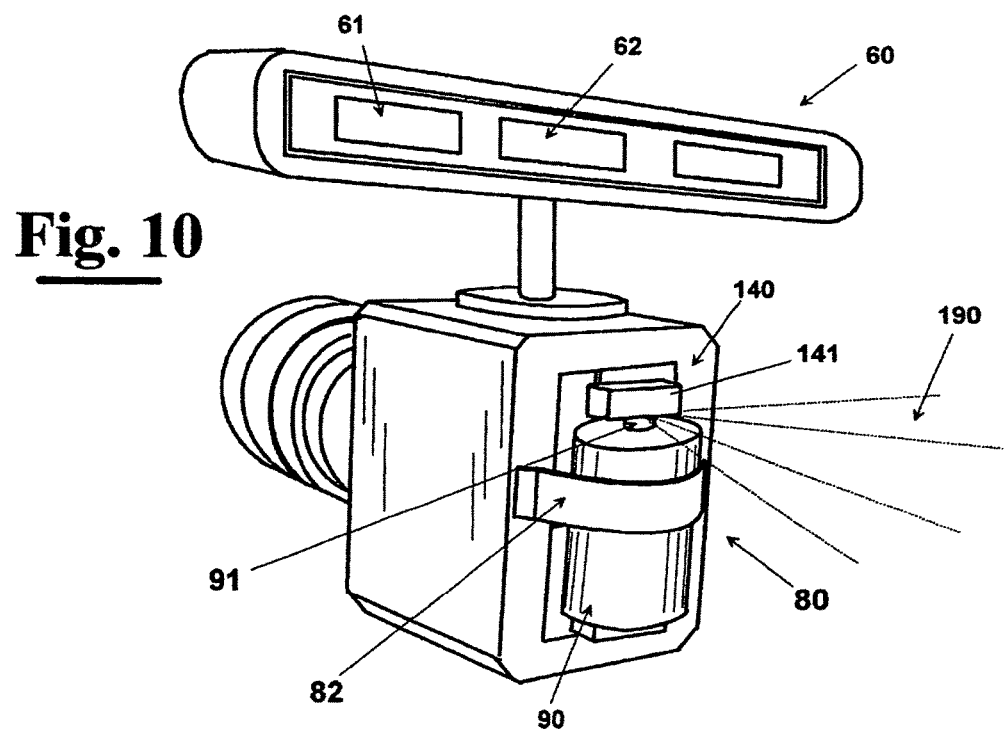

The interface means 80 is advantageously provided of actuating means 140 arranged to operate a predetermined tool 90. In the example of FIGS. 9 and 10, for example, the tool 90 is a spray can of spray paint equipped with a delivery valve 91. In this case, the actuating means 140 provides an actuator member 141 movable between a position spaced from the valve 91 in which no delivery of paint is provided (FIG. 9) to an operating position, in which the actuator member 141 presses the valve 91 to open the same and to cause the delivery of a spray of paint 190 (FIG. 10).

In the exemplary embodiment of FIGS. 11A to 11D, the actuating means 140 provides an anthropomorphic hand of robotic type able to adapt mechanically itself to the shape of the manipulated tool 90 and comprising a main body 145 and a plurality of secondary elongated bodies 146, or phalanxes, for example three secondary elongated bodies 146a-146c pivotally connected to the main body 145. Each secondary elongated body 146 consists of a predetermined number of stiff bodies 147, or "link", for example three stiff bodies 147a-147c arranged in series and pivotally connected at hinges 148.

In the further exemplary embodiment of FIGS. 11 to 15 the actuating means 140 provides a plurality of leverages 41 arranged to transform the rotational moving of a motor 42 in a translational movement, in order to pull/release a "trigger"

95 of the supply gun 90 and then causing, respectively the opening, or the closing, of a valve 91.

Figure 16A:
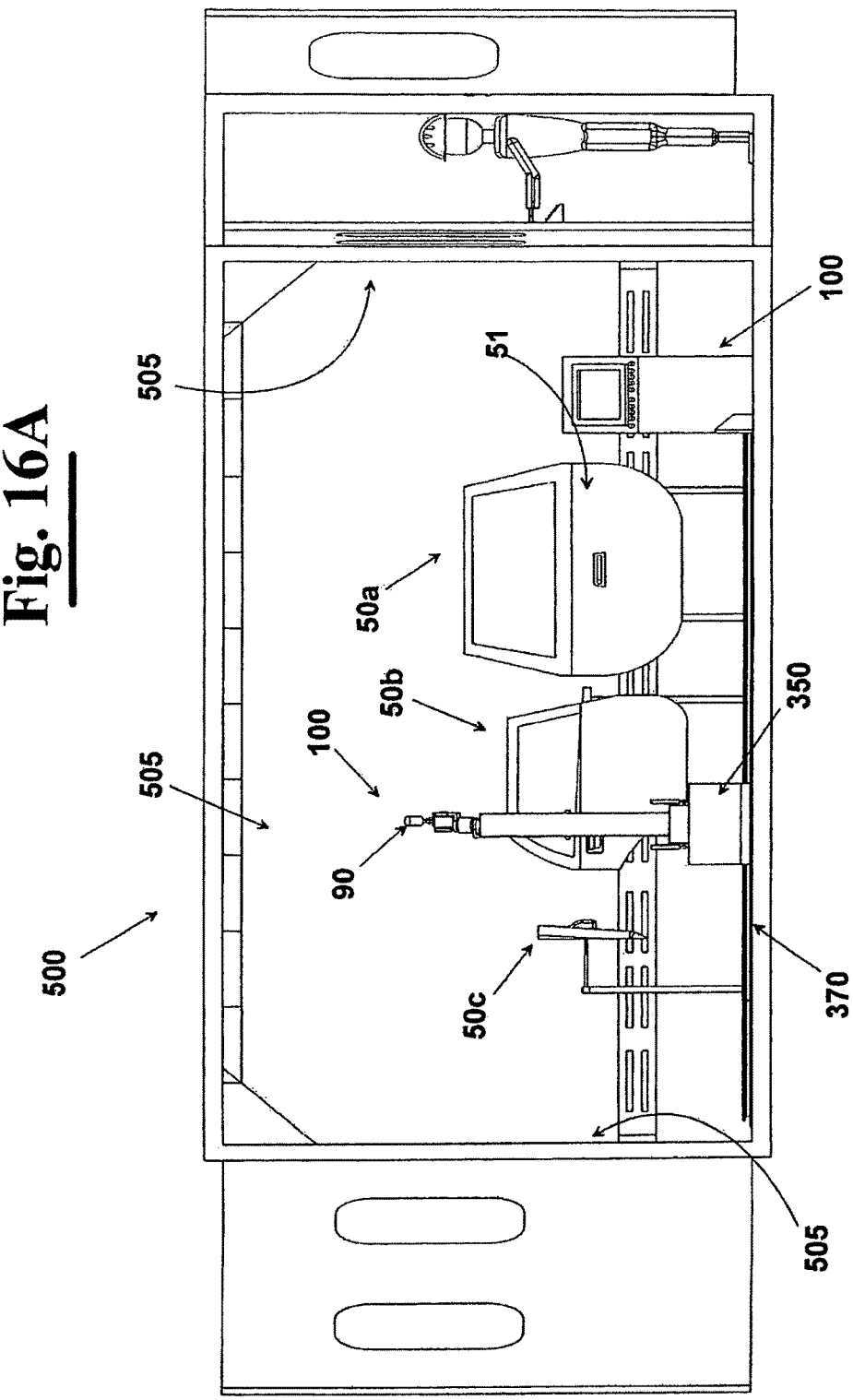
FIGS. 16A and 16B diagrammatically show, respectively an elevational side view of and a partially cross sectional perspective view of a possible painting cabin in which a first exemplary embodiment of the apparatus of FIG. 1 can be installed.
Figure 16B:
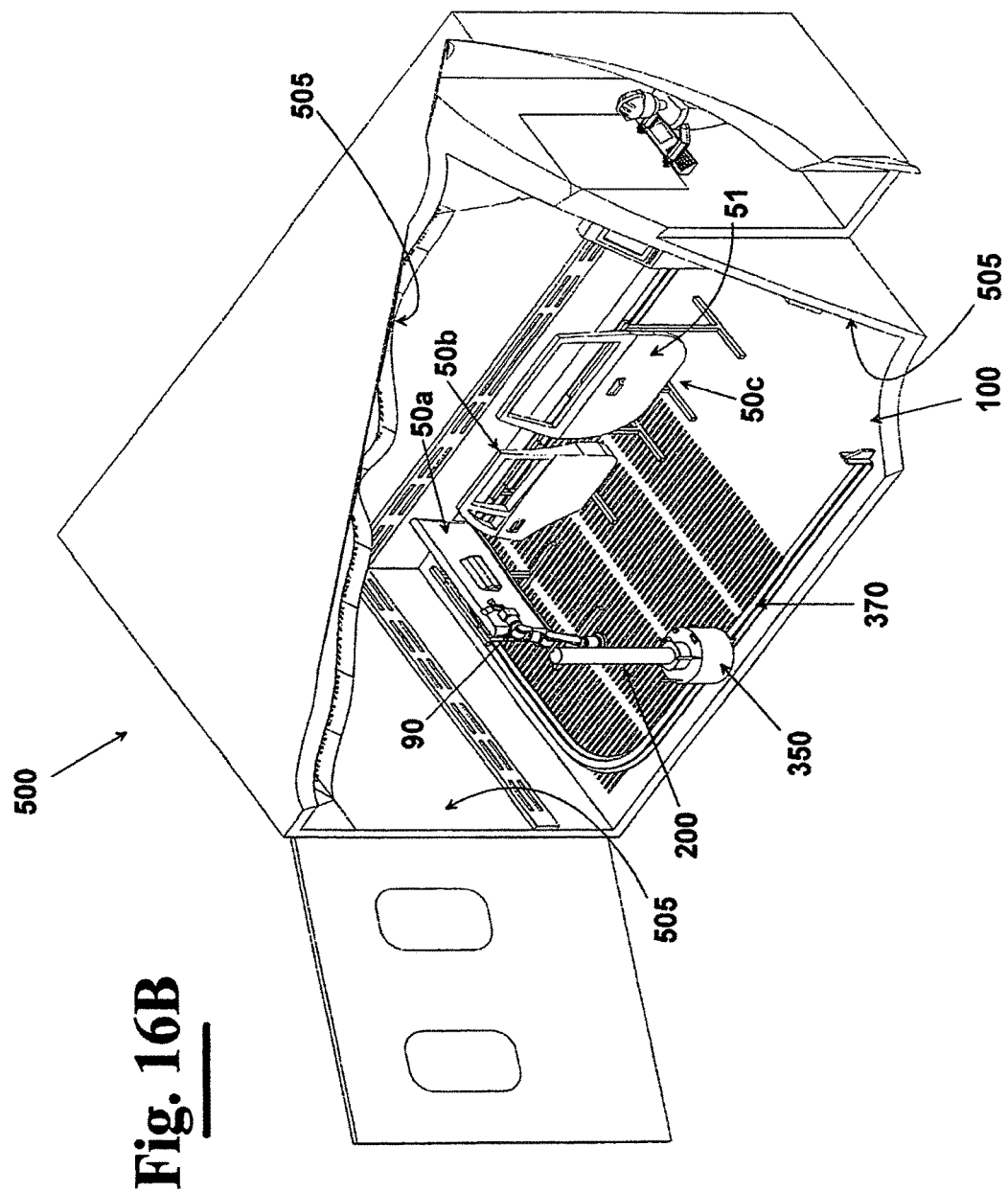

As diagrammatically shown in FIGS. 16A and 16B, the apparatus 100 can be arranged in a painting cabin 500 in which the painting head 70 and the objects to be painted, for example three objects 50a, 50b and 50c are arranged in respective positions before starting a painting operation.

Figure 18:
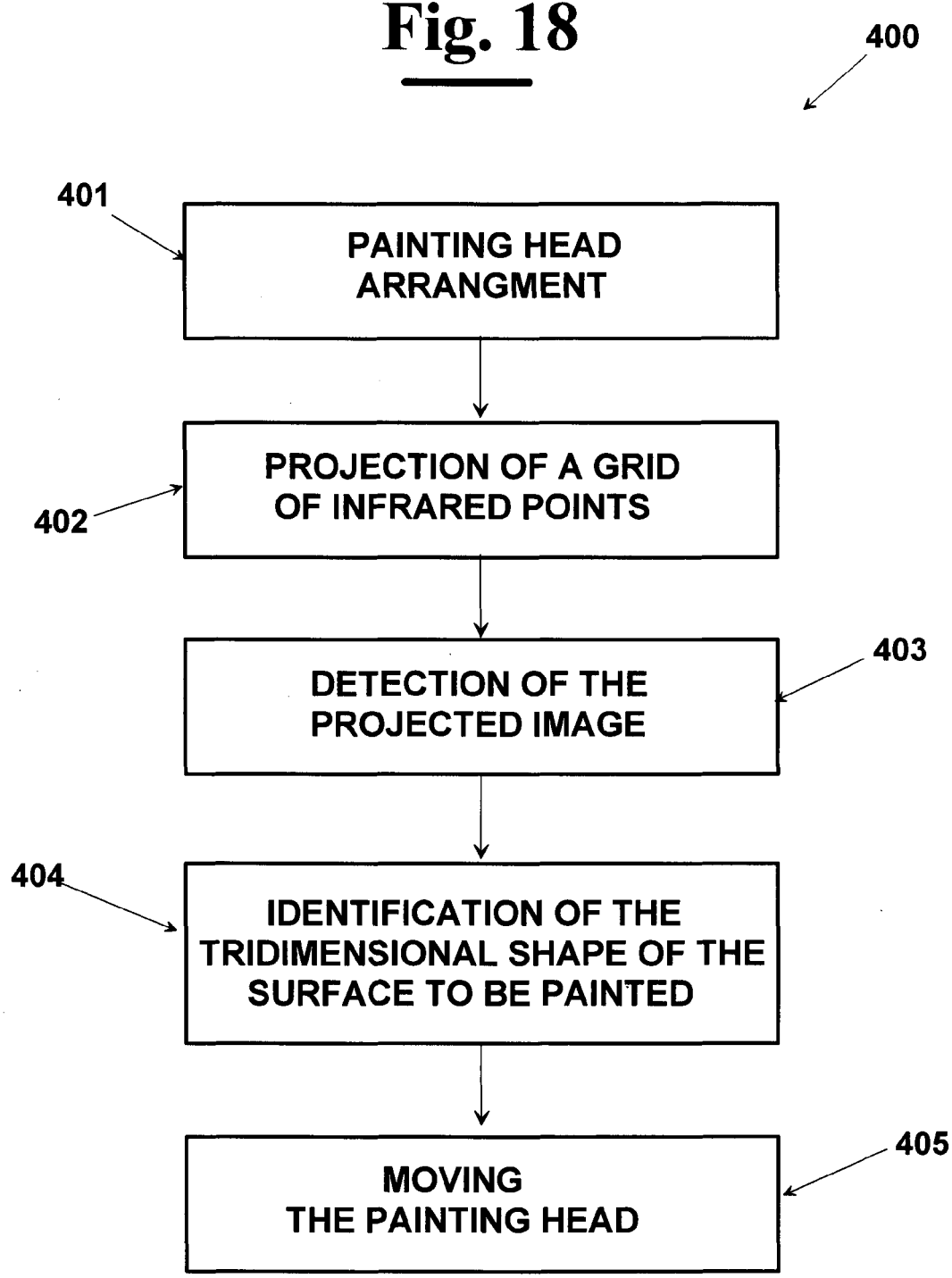
FIG. 18 diagrammatically shows a block diagram of the main steps of the method, according to the invention, for painting an object.

In FIG. 18, the main phases of a method for painting an object according to the present invention are diagrammatically shown. The method provides a starting step of arranging a painting head equipped with at least one spraying nozzle arranged to deliver a flow of paint on a surface of an object to be painted, block 401. A step follows of projecting a grid, or matrix, of infrared points on the surface of the object to be painted, block 402, obtaining a projected image comprising a plurality of points having determined spatial coordinates. A detecting step of a projected image, thus, follows carried out by an optical sensor means integral to the painting head obtaining a detected projected image, block 403. There is then a processing step of the projected image for determining the spatial coordinates (x,y,z) of each point of the detected projected image in order to determine the three-dimensional shape of the object, block 404. On the basis of the data obtained by the processing data step and, in particular of the spatial coordinates (x,y,z), the painting head is then moved in the workspace in such a way that during the painting the spraying nozzle is arranged at a distance d substantially fixed from the surface of the object, block 405.

Figure 19:
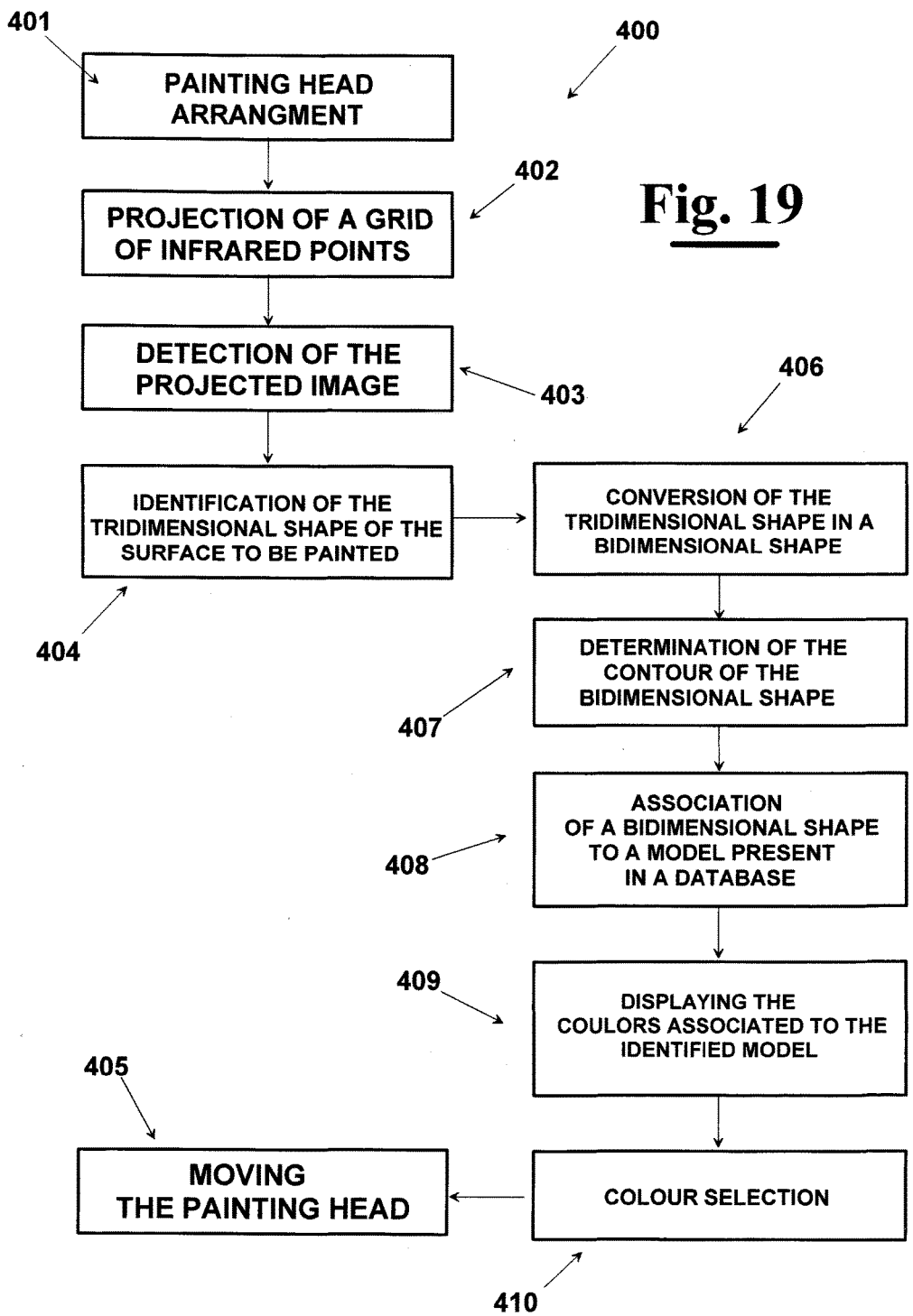
FIG. 19 diagrammatically shows a block diagram of an exemplary implementation of the method of FIG. 18 for painting an object.

In an exemplary embodiment and diagrammatically shown in FIG. 19, before starting the step of moving, block 405 for painting the object, a conversion step is provided for converting the detected three-dimensional shape of the surface in a two-dimensional geometric shape of the same object, block 406. The obtained two-dimensional geometric shape is then computed for determining the contour, or perimeter, block 407. A comparing step is then provided for comparing the obtained two-dimensional geometric shape by a plurality of models contained in a database and, accordingly, an associating step for associating the two-dimensional geometric shape to a model of the above described plurality of models at the conditions described above with reference to FIGS. 5 and 6, block 408.

Then, a displaying step follows in which the identified model is displayed with the related data concerning the size and/or the variety of colours associated with the model same, block 409. On the basis of the displayed possible colours the operator, or automatically the system, selects one of the colours associated with said model, block 410. Then, an arranging step can follows of a gun containing the selected colour in the painting head. Alternatively, there is a step of feeding in a fixed reservoir having a spraying nozzle, for example through a plurality of ducts, of paint of the selected colour. Follows the above described step of moving the painting head for painting the object with the selected colour.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A method for painting an object, said method comprising the steps of:
    arranging a painting head in a predetermined working area, said painting head equipped with at least one spraying nozzle arranged to deliver a flow of paint on a surface of an object;
    moving said painting head in said working area, said moving being carried out by moving means having at least two degrees of freedom;
    identifying the three-dimensional shape of said surface of said object, said identifying step comprising the steps of:
        projecting a grid, or matrix, of infrared points on said surface of said object, obtaining a projected image comprising a plurality of points;
        detecting said projected image obtaining a detected projected image comprising a plurality of points, or pixels, having determined spatial coordinates, said detecting step carried out by optical sensor means integral to said painting head;
        processing said detected projected image, said processing step arranged to determine said spatial coordinates of each of said points of said detected projected image in order to determine the three-dimensional shape of said object, said spatial coordinates x, y being determined on the basis of the position of each point, or pixel, in the detected projected image, said processing step comprising a step of converting said three-dimensional shape in a two-dimensional geometric shape of said surface of said object, said converting step being carried out computing the grey-level values of said points, or pixels, of said detected projected image;
    moving said painting head in said working area on the basis of said spatial coordinates of said points in such a way that during said painting step, said spraying nozzle is arranged at a substantially fixed distance from said surface of said object and can follow its curvature.

2. A method, according to claim 1, wherein said processing step further comprises the steps of:
    comparing said two-dimensional geometric shape with the two-dimensional geometric shapes of a plurality of models contained in a predetermined database, said comparing step being carried out on the basis of the grey-level values of a predetermined group of points of said detected projected image and of a corresponding group of points of said models;
    associating to each model of said plurality of a corresponding similarity index $i_s$ with said object;
    selecting among said plurality of models the model having the highest similarity index, or the similarity index $i_s$ that is higher than a predetermined threshold value $i_s^*$;
    associating said selected model to said two-dimensional geometric shape of said object;
    displaying a variety of colours associated to said selected model;
    selecting a predetermined colour among said variety of colours.

3. A method, according to claim 1, wherein said comparing step comprises the steps of:

identifying the contour, or perimeter, of said two-dimensional geometric shape on the basis of said grey-level values of said points, or pixels, of said detected projected image;
said identifying step providing the steps of:
computing the highest grey-level value $l_{max}$ among all the points, or pixels, of said plurality of points of said detected projected image, corresponding to the point, or pixel, that is most distant from said sensor means;
computing the lowest grey-level value $l_{min}$ among all the points, or pixels, of said plurality of points of said detected projected image, corresponding to the point, or pixel, nearest to said sensor means;
associating a first grey-level value, to all the points having a grey-level value set between $l_{max}$ and $l_{min}$ and a second grey-level value to all the points having a different grey-level;
comparing said defined contour, or perimeter, with the contour, or perimeter, of said plurality of models contained in said database.

4. A method, according to claim 3, wherein said first grey-level value is "255" corresponding to the white and said second grey-level value is "0" corresponding to the black.

5. A method, according to claim 1, wherein a centering step is provided for centering said sensor means with respect to said surface of said object to be detected, said centering step comprising the steps of:
detecting a position of said optical sensor means with respect to said surface of said object, said detection comprising the steps of:
determination, by said processing means, the spatial coordinates of a centroid of said detected projected image;
creating a geometric figure of reference arranged to approximate said detected projected image;
identifying, by said processing means, the center of said geometric figure of reference;
moving said optical sensor means and said painting head with respect to said object up to cause said center of said geometric figure to coincide substantially with said centroid of said detected projected image and with said position of said optical sensor means.

6. A method, according to claim 1 wherein said spatial coordinates z is determined on the basis of the grey-level value of the corresponding point, or pixel.

* * * * *